(12) United States Patent
Verdier et al.

(10) Patent No.: US 8,774,345 B2
(45) Date of Patent: Jul. 8, 2014

(54) BOTTOM END-PIECE HAVING AN ANTI-DEBRIS DEVICE WITH A BAFFLE FOR A NUCLEAR ASSEMBLY AND CORRESPONDING ASSEMBLY

(75) Inventors: Michel Verdier, Lyons (FR); Eric Labarriere, Saint Eloi (FR)

(73) Assignee: Areva NP, Courbevoie (FR)

( * ) Notice: Subject to any disclaimer, the term of this patent is extended or adjusted under 35 U.S.C. 154(b) by 896 days.

(21) Appl. No.: 12/448,225

(22) PCT Filed: Dec. 5, 2007

(86) PCT No.: PCT/FR2007/001997
§ 371 (c)(1),
(2), (4) Date: Jun. 12, 2009

(87) PCT Pub. No.: WO2008/087267
PCT Pub. Date: Jul. 24, 2008

(65) Prior Publication Data
US 2010/0034337 A1 Feb. 11, 2010

(30) Foreign Application Priority Data
Dec. 13, 2006 (FR) ..................... 06 10877

(51) Int. Cl.
*G21C 3/34* (2006.01)
*G21C 3/322* (2006.01)
(52) U.S. Cl.
CPC ..................... *G21C 3/322* (2013.01)
USPC ........... 376/439; 376/438; 376/434; 376/426; 376/409; 376/462
(58) Field of Classification Search
USPC .......... 376/347, 352, 438, 439, 440, 443, 462
See application file for complete search history.

(56) References Cited

U.S. PATENT DOCUMENTS

| | | | |
|---|---|---|---|
| 4,655,995 A | | 4/1987 | Freeman et al. |
| 4,684,495 A | * | 8/1987 | Wilson et al. ................ 376/352 |
| 4,684,496 A | * | 8/1987 | Wilson et al. ................ 376/352 |
| 4,919,883 A | * | 4/1990 | Bryan ........................... 376/352 |
| 5,030,412 A | | 7/1991 | Yates et al. |
| 5,219,517 A | * | 6/1993 | Nylund ......................... 376/352 |
| 5,420,901 A | | 5/1995 | Johnson |
| 5,867,551 A | | 2/1999 | Toshihiko |
| 7,856,076 B2 | * | 12/2010 | Labarriere et al. ............ 376/453 |
| 2003/0128798 A1 | * | 7/2003 | Kageyama et al. ........... 376/310 |
| 2006/0045231 A1 | * | 3/2006 | Lee et al. ...................... 376/439 |
| 2007/0165767 A1 | | 7/2007 | Labarriere et al. |

FOREIGN PATENT DOCUMENTS

| | | |
|---|---|---|
| DE | 296 15 575 U1 | 1/1997 |
| FR | 2864324 A1 | 6/2005 |
| JP | 2001-174579 A | 6/2001 |
| JP | 2004-340580 A | 12/2004 |

* cited by examiner

*Primary Examiner* — Jack W Keith
*Assistant Examiner* — Marshall O'Connor
(74) *Attorney, Agent, or Firm* — Davidson, Davidson & Kappel, LLC (57) ABSTRACT

This bottom end-piece includes nozzles for directing the flow of water of the reactor along the lower ends of the fuel rods, the nozzles being arranged at nodes of the substantially regular network of the fuel rods, and an anti-debris device which delimits water flow channels. At least some of the water flow channels are arranged at nodes of the substantially regular network. Direction nozzles are arranged at least partially in the channels in order to delimit water passages therewith, and at least one water passage includes a first section and a second section which are mutually offset radially relative to the corresponding node of the network in order to form a baffle.

21 Claims, 6 Drawing Sheets

BOTTOM END-PIECE HAVING AN ANTI-DEBRIS DEVICE WITH A BAFFLE FOR A NUCLEAR ASSEMBLY AND CORRESPONDING ASSEMBLY

The present invention relates to a bottom end-piece for a fuel assembly of a light water nuclear reactor.

The invention is used particularly, but not exclusively, for producing bottom end-pieces for nuclear fuel assemblies for light water reactors (LWR).

BACKGROUND

Conventionally, a bottom end-piece of a nuclear fuel assembly performs three functions.

The first is a function involving mechanical strength since the end-piece forms part of the skeleton of the nuclear fuel assembly and the assembly is supported on the lower core plate thereby.

The second function is a function for distributing the cooling water which flows in the core of the reactor vertically from bottom to top at an ascending rate which is very high.

More precisely, the water enters the core through the lower core plate, then passes through the bottom end-piece, before coming into contact with the outer surfaces of the fuel rods.

The third is a function for retaining debris. When flowing in the coolant circuit of the nuclear reactor, the cooling water accumulates debris which may be present. It is desirable to prevent this debris from becoming wedged between the fuel rods and the elements which retain them, in particular in the region of the lower grid of the skeleton. This debris, which is then subject to significant axial and transverse hydraulic forces in this zone could bring about wear of the claddings of the fuel rods and result in losses in terms of sealing and an increase in the level of activity of the coolant circuit of the reactor.

This function is fulfilled by anti-debris devices which may be integrated in or fitted to the bottom end-piece and may be complex to a greater or lesser extent.

Document U.S. Pat. No. 5,030,412 describes a complex anti-debris device which delimits passages which successively form, in a vertical cross-section, two baffles which allow a higher volume of debris to be retained.

However, bottom end-pieces which are provided with such more complex anti-debris devices lead to a greater pressure drop. This pressure drop becomes evident with a lower level of cooling efficiency for the nuclear fuel rods and the need to compensate for this additional pressure drop by increasing the hydraulic transparency of other components of the nuclear fuel assembly and/or with a greater axial retention force applied to the nuclear fuel assembly by the upper core plate.

Furthermore, the presence within the same reactor core of nuclear fuel assemblies which are provided with bottom end-pieces having a low pressure drop and assemblies which are provided with bottom end-pieces having a higher pressure drop is also problematic. It leads to occurrences of redistribution of the cooling water in the lower portion of the rods of the assemblies, bringing about lateral flows which may reach significant speeds. These lateral flows could lead to damage to the rods owing to friction of the claddings thereof on the grids of the skeleton. A phenomenon of this type is generally referred to as "fretting".

More generally, such fretting phenomena could occur between the lower grid of the support skeleton and the claddings of the nuclear fuel rods, even when the core is loaded with assemblies having bottom end-pieces which bring about the same pressure drop, owing to the vibrations of the lower ends of the nuclear fuel rods.

These fretting phenomena could damage the claddings, which could cause fission gas or products to be released into the water of the coolant circuit.

In order to overcome this problem of fretting, FR-2 864 324 described a bottom end-piece of the above-mentioned type. Preferably, the lower ends of the nuclear fuel rods are retained axially and laterally in blocks which cover the nozzles for directing the flow of water. This retention and the improved guiding of the cooling water by the nozzles around the nuclear fuel rods, allows the vibrations of the lower ends of the rods to be limited and therefore allows the risk of damage caused by fretting to be reduced.

The bottom end-piece of this document may further be provided with an anti-debris device which is fitted above the network of nozzles for directing the flow of cooling water. In a variant, this device may be integral with the nozzle network.

A bottom end-piece of this type is satisfactory but it appears to be desirable to further increase the capacity thereof for retaining debris.

SUMMARY OF THE INVENTION

An object of the invention is to overcome this problem by providing a bottom end-piece of the type mentioned above which has an improved capacity for retaining debris whilst bringing about a reduced pressure drop.

The invention provides a fuel assembly comprising fuel rods and a skeleton for supporting the fuel rods, the fuel rods extending in a longitudinal direction and being arranged at the nodes of a substantially regular network, the support skeleton comprising a bottom end-piece and a top end-piece and elements for connecting the end-pieces, the fuel rods being arranged longitudinally between the end-pieces, the bottom end-piece being of the type comprising: nozzles for directing the flow of water of the reactor along the lower longitudinal ends of the fuel rods, the nozzles being arranged at nodes of the substantially regular network so as to be placed in the longitudinal continuation of at least some of the fuel rods and/or at least some of the connection elements of the support skeleton, and an anti-debris device which delimits water flow channels. The bottom end-piece of the above-mentioned type, characterised in that at least some of the water flow channels are arranged at nodes of the substantially regular network, in that direction nozzles are arranged at least partially in the channels in order to delimit water passages therewith, and in that at least one water passage comprises a first section and a second section which are mutually offset radially relative to the corresponding node of the network in order to form a baffle.

According to specific embodiments, the end-piece may comprise one or more of the following features, taken in isolation or according to any technically possible combination(s):

- no water flow line may extend longitudinally through the passage in a rectilinear manner,
- the water passage comprises a third section which is radially offset relative to the second section with respect to the corresponding node of the network, the first section, the second section and the third section following each other in order to form two successive baffles of opposing directions,
- at least one of the water passages surrounds the corresponding nozzle, at least one water passage has a downstream portion which diverges in the flow direction of the water, at least one water passage has an upstream portion which converges in the flow direction of the water, the nozzles and the anti-debris device are integral, the end-piece comprises at least one additional grid for retaining debris which is fitted upstream and/or downstream of the passages, the end-piece comprises at least one debris retaining sleeve which extends longitudinally between the downstream end of a water flow channel and a block which covers the corresponding nozzle, the sleeve comprises a zone which has no water flow opening and which delimits a cavity for trapping debris with the nozzle, the end-piece comprises means for laterally retaining the lower longitudinal ends of substantially all the fuel rods, and the retention means comprise holes for receiving the lower longitudinal ends of the fuel rods which are provided in blocks which cover the nozzles.

The invention also provides a nuclear fuel assembly for a nuclear reactor, the assembly comprising fuel rods and a skeleton for supporting the fuel rods, the fuel rods extending in a longitudinal direction and being arranged at the nodes of a substantially regular network, the support skeleton comprising a bottom end-piece and a top end-piece and elements for connecting the end-pieces, the fuel rods being arranged longitudinally between the end-pieces, characterised in that the bottom end-piece is an end-piece as defined above, the nozzles being arranged longitudinally below fuel rods or elements for connecting the end-pieces.

BRIEF DESCRIPTION OF THE DRAWINGS

The invention will be better understood from a reading of the following description, given purely by way of example and with reference to the appended drawings, in which.

DETAILED DESCRIPTION

Figure 1:
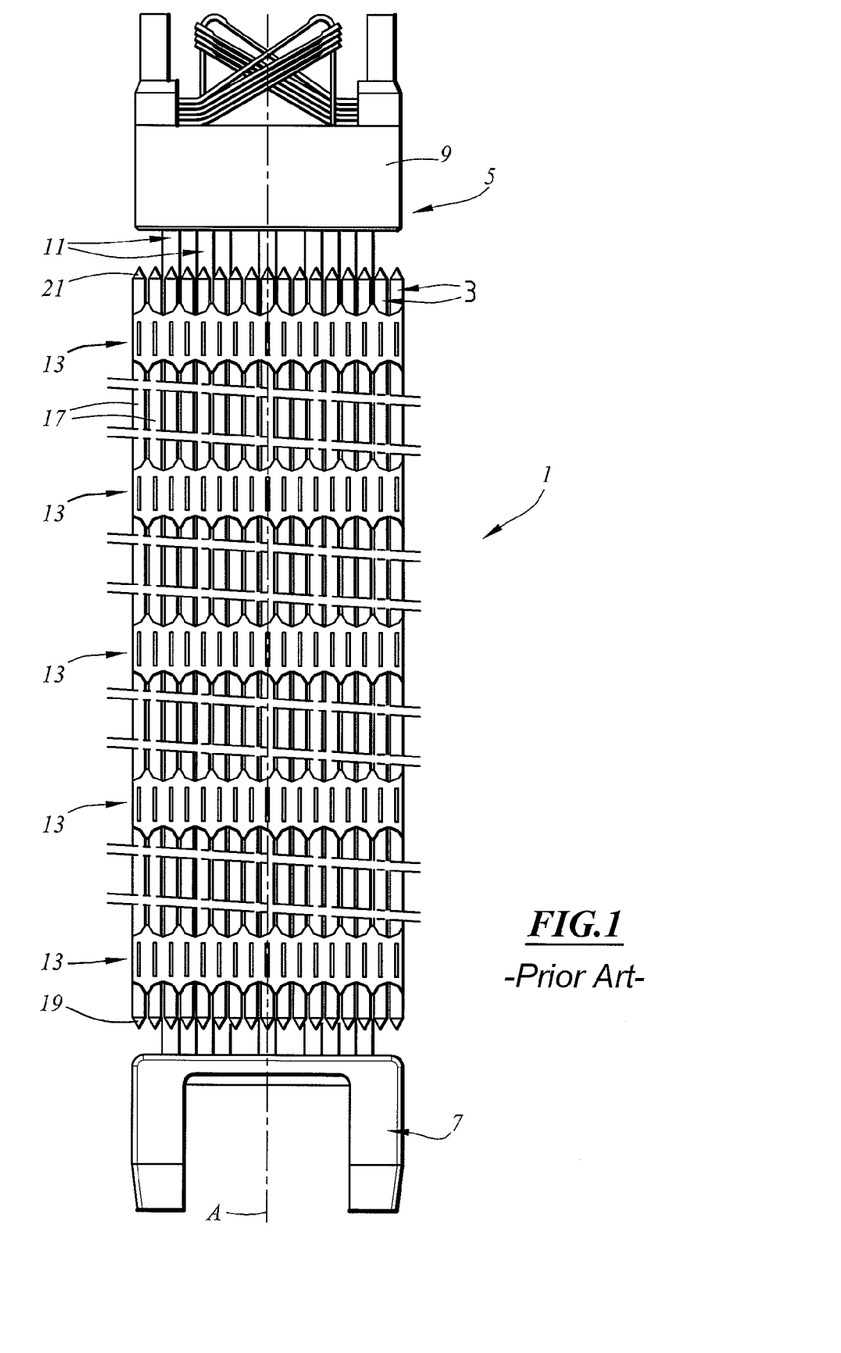
FIG. 1 is a schematic lateral view of a fuel assembly according to the prior art.

In order to illustrate the context of the invention, FIG. 1 is a schematic illustration of a nuclear fuel assembly 1 for a pressurised water reactor. The water performs a cooling and moderating function, that is to say, slows down the neutrons produced by the nuclear fuel.

The assembly 1 extends vertically and in a rectilinear manner in a longitudinal direction A.

In conventional manner, the assembly 1 principally comprises nuclear fuel rods 3 and a structure or skeleton 5 for supporting the rods 3.

The support skeleton 5 conventionally comprises:

a bottom end-piece 7 and a top end-piece 9 which are arranged at the longitudinal ends of the assembly 1, tubular guiding members 11 which are intended to receive the rods of a fixed cluster which is not illustrated and which controls the nuclear reactor, and grids 13 for retaining the rods 3 or mixing the water.

The end-pieces 7 and 9 are fixed to the longitudinal ends of the tubular guiding members 11.

The rods 3 extend vertically between the end-pieces 7 and 9. The rods 3 are arranged at the nodes 100 of a substantially regular network having a square base where they are retained by the grids 13. Some of the nodes 100 of the network are occupied by the tubular guiding members 11 and optionally by an equipment tube 14 which can be seen in the centre of FIG. 2. In this FIG. 2, the rods 3 are indicated with dashed lines, the tubular guiding members 11 with a solid line and the equipment tube 14 is represented by a black circle.

Figure 2:
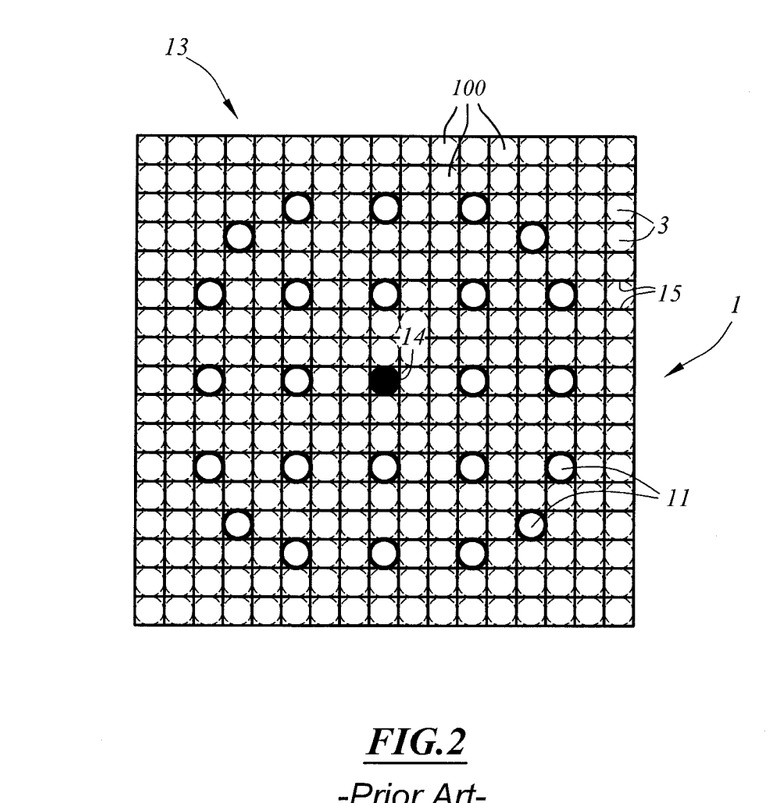
FIG. 2 is a schematic plan view illustrating the distribution of the fuel rods in the assembly of FIG. 1.

The grids 13 conventionally comprise sets of intersecting plates which together delimit cells which are centred on the nodes of the regular network. The majority of the cells are intended to receive a fuel rod 3. Twenty-four cells each receive a tubular guiding member 11 and the central cell receives the equipment tube 14.

In the example of FIGS. 1 and 2, the retention grids 13 comprise 17 cells per side and the regular network comprises the same number of nodes per side.

In other variants, the number of cells and nodes per side may be different, for example, from 14×14 to 18×18 for a fuel assembly for a pressurised water reactor and from 7×7 to 11×11 for a fuel assembly for a boiling water reactor.

Each rod 3 conventionally comprises an outer cladding 17 which is closed by means of a lower plug 19 and an upper plug 21, and which contains the nuclear fuel. This is, for example, stacked fuel pellets, the pellets being supported on the lower plug 19.

A helical retention spring which is not illustrated may be arranged in the cladding 17 between the upper pellet and the upper plug 21.

Figure 3:
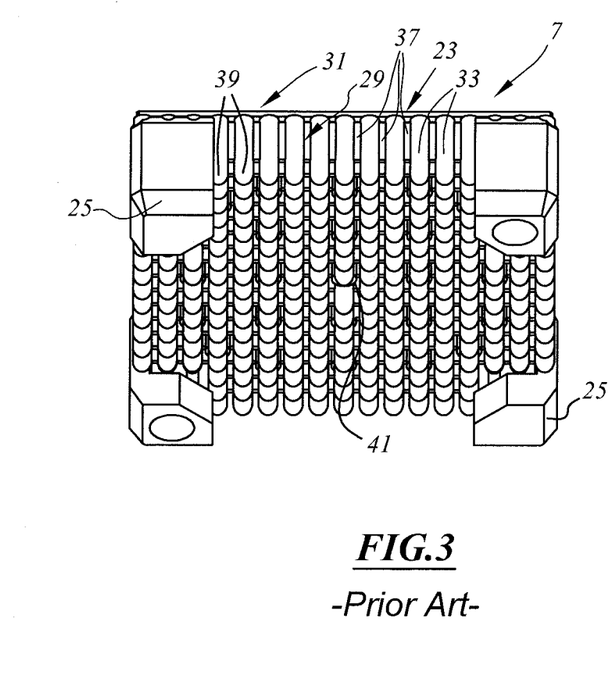
FIG. 3 is a schematic perspective view of a bottom end-piece according to the prior art.

FIG. 3 illustrates a bottom end-piece 7 according to the prior document FR-2 864 324.

The end-piece 7 comprises a horizontal wall 23 and feet 25 which extend the wall 23 downwards so as to be supported on the lower plate of the core of the reactor.

The wall 23 has a generally planar parallelepipedal form and the feet 25 are each arranged in a corner of the wall 23. The wall 23 comprises a lower body 29 and an upper plate 31 which covers the body 29.

The body 29 comprises a plurality of blocks 33 which are arranged at the nodes of the same network as the fuel rods 3, the tubular guiding members 11 and the optional equipment tube 14.

In this manner, as can be seen in FIG. 3, the body 29 comprises 17×17 cylindrical blocks 33.

Each block 33 is therefore located longitudinally below a fuel rod 3, a tubular guiding member 11 or the equipment tube 14 if the assembly 1 has one.

The blocks 33 are connected together by means of strengthening ribs 37 which extend across the lower body 29.

The blocks 33 which are arranged below the fuel rods 3, that is to say, the majority of the blocks 33, have a diameter which substantially corresponds to the outer diameter of the rods 3 and are extended in a downward direction by nozzles 39 for directing the flow of the water. These nozzles 39 are substantially pointed, converging in a downward direction, and are integral with the blocks 33 in question.

As described in FR-2 864 324, the blocks 33 which are arranged below the tubular guiding members 11 do not comprise integrated nozzles 39. These are replaced by screws for fixing the end-piece 7 to the tubular guiding members 11.

These screws extend through the corresponding blocks 33. The screw heads are substantially pointed and also constitute nozzles 39 for directing the flow of water. In a variant, the screw heads may have other shapes and may not constitute directing nozzles.

Generally, a nozzle 39 is not provided below the equipment tube 14, which may be present, in order to allow the passage of the corresponding sensor.

In this manner, the lower body 29 of the end-piece 7 has a nozzle network 39 which is similar to that of the fuel rods 3, the tubular guiding members 11 and the optional equipment tube 14.

This network is interrupted only in the region of the optional equipment tube 14. In some variants, the network may also be interrupted locally in the region of this tube 14 to a greater extent. In these variants, most of the rods 3 nonetheless remain arranged above nozzles 39. In a variant, the outer contour of the lower body 29 may be provided with a skirt which connects the peripheral blocks 33 located between the feet 25 to each other and which also connects these blocks 33 to the feet 25. This skirt may have upper and lower chamfers in order to facilitate the handling of the assembly.

The blocks 33 which are arranged below the fuel rods 3 further have blind holes for receiving the lower plugs 19 of the rods 3 and thus retaining the rods 3 laterally and axially.

The upper plate 31 itself forms an anti-debris device.

The present invention, illustrated in FIGS. 4 to 6, constitutes an improvement of the type of bottom end-piece 7 of FIG. 3 and is distinguished principally by the features which are described below and/or which can be seen in the Figures.

Figure 4:
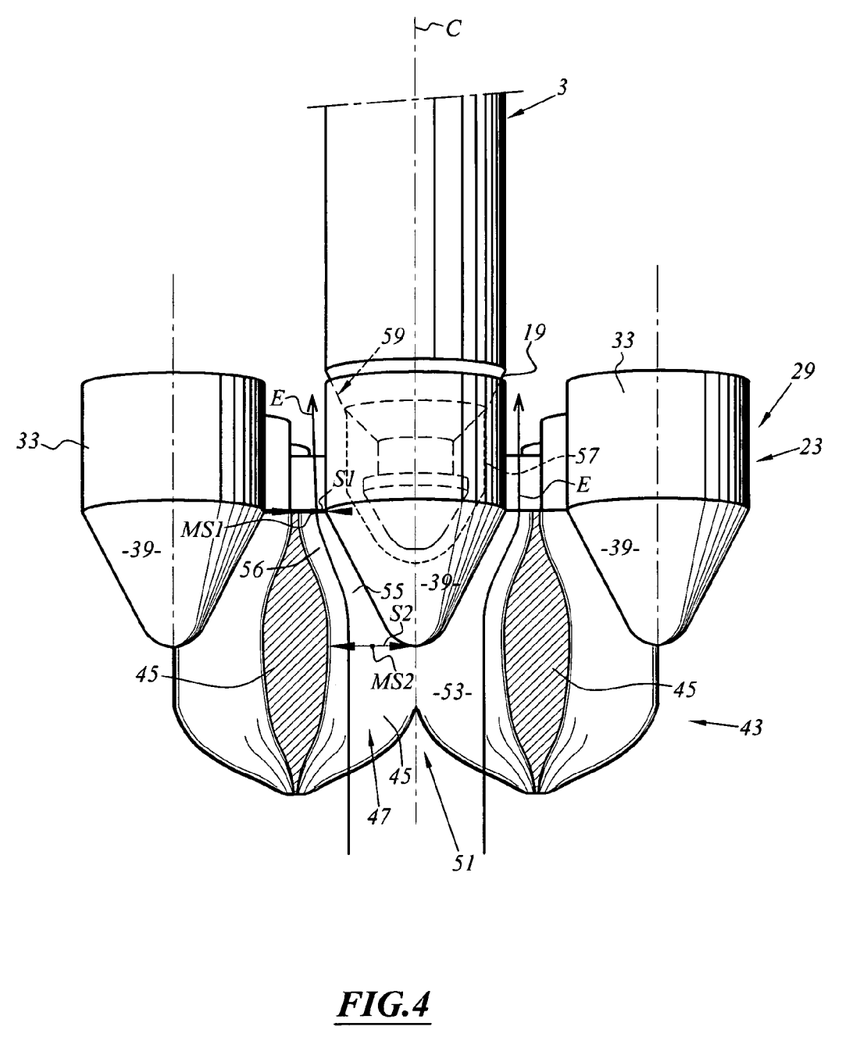
FIG. 4 is a schematic, cut-away, partial side view illustrating the structure of a bottom end-piece according to a first embodiment of the invention.

In the embodiment of FIG. 4, the horizontal wall 23 of the bottom end-piece 7 still comprises a body 29 which comprises a plurality of blocks 33 which are arranged at the nodes of the same network as the fuel rods 3, the tubular guiding members 11 and the optional equipment tube 14.

These blocks 33 are also, as described above, extended downwards by nozzles 39 for directing the flow of cooling water. In the example illustrated, the nozzles 39 have substantially conical shapes which converge downwards. It can be seen in FIG. 4 that the ribs 37 which connect the foremost blocks 33 have not been illustrated.

In the example which is also illustrated, the grid 31 has been dispensed with and replaced by a metal lower plate 43 which is arranged below the body 29 and which is integral with the body 29. This plate 43 forms an anti-debris device as described below.

It is also possible to produce the body 29 and the plate 43 in the form of two separate components which are fitted to each other. Their mutual fixing can be provided, for example, by means of welding at the outer corners of the body 29 and the lower plate 43 and furthermore by means of the screws for fixing the tubular guiding members 11 to the bottom end-piece 7 which press the lower plate 43 against the body 29. The plate 43 and the body 29 are, for example, produced from a material which is resistant to wear, such as, for example, a nickel-based alloy of the Inconel type (registered Trade Mark), a steel of the type A286 or an alloy based on titanium.

The lower plate 43 comprises a grid of partitions 45 which together delimit channels 47 which extend vertically through the plate 43.

The channels 47 are arranged at the nodes of the same network as the fuel rods 3, the tubular guiding members 11 and the optional equipment tube 14.

It is possible for the lower plate 43 to comprise, in the same manner as the body 29, some irregularities, in particular in the region of the tubular guiding members 11 or the optional equipment tube 14.

Since the channels 47 have a similar structure, only that of the channel 47 which can be seen in FIG. 4 will be described below. In this Figure, two lateral partitions 45 which bound the channel 47 have been sectioned along a vertical centre plane.

The channel 47 has successive cross-sections in the form of discs and comprises, successively, in the upward flow direction of the cooling water, a convergent lower half and a divergent upper half. The convergent and divergent forms mentioned above are obtained owing to intermediate protrusions of the partitions 45 which delimit the channel 47.

The nozzle 39 associated with the same node of the network as the channel 47 is engaged in the upper half of the channel 47.

The nozzle 39 thus delimits, in the channel 47, a passage 51 for cooling water which comprises, on the one hand, a lower half 53 which converges in an upward direction and is composed of a succession of sections in the form of discs, and, on the other hand, an upper half 55 which remotely surrounds the nozzle 39 and which is composed of a succession of annular sections. The disc-like annular sections mentioned above are centred on the longitudinal and central axis C of the corresponding rod 3, that is to say, the one associated with the same node of the network as the channel 47, the block 33 and the nozzle 39 in question. This rod 3 is the only one illustrated in FIG. 3.

The cross-sections of the upper half 55 move radially towards the axis C when moving towards the lower half 53 of the passage 51.

In this manner, the downstream section S1 of the upper half 55 is located radially further outwards relative to the axis C than the upstream section S2 of the upper half 55, section S2, which is also referred to as the intermediate section of the passage 51. The radial position of a section in question corresponds, for example, to the centre of the double-headed arrow illustrated in FIG. 4. In this manner, the centre MS1 of the section S1 is arranged radially further outwards than the centre MS2 of the section S2.

The upper half 55 therefore forms a baffle 56. This is further indicated by the two arrows E which illustrate flow lines of the water. These arrows E illustrate that the flow lines of the water are diverted laterally by the baffle 56 relative to the vertical.

Preferably, as in the example illustrated, the baffle 56 formed is such that no flow line may vertically extend through the passage 51 in a straight line. This is achieved in the example illustrated owing to the fact that the outer diameter of the section S2 is less than or equal to the inner diameter of the section S1. If sections other than circular and annular sections are envisaged, a similar relationship will exist between the transverse dimensions of the sections. For example, for square sections, this relationship will exist between the lengths of the sides of the squares.

As illustrated with dashed lines in FIG. 4, the lower plug 19 of the fuel rod 3 in question is received in a blind hole 57 which is arranged in the block 33 which covers the nozzle 39 in question.

The stopper 19 is supported, for example, via a conical surface 59 on a conical surface having a complementary shape provided in the hole 57. In this manner, the rod 3 rests on the block 33 and is therefore retained axially counter to the effect of gravity and laterally counter to the effect of the transverse flows.

As in the prior art of FIG. 3, the presence of the nozzles 39 allows the flow lines of the water to be orientated substantially vertically along the lower ends of the rods 3 and therefore allows the lateral flow rates of the water to be reduced. The vibrations of the lower ends of the rods 3 are thus reduced during the operation of the reactor. These vibrations are further reduced owing to the lateral retention of the lower ends of the rods 3 by the end-piece 7 itself. The risks of damage to the claddings 17 of the rods 3 caused by fretting are therefore limited.

Furthermore, the presence of the lower plate 43 allows the debris retention capacity to be substantially increased, in particular owing to the presence of the baffles 56 in the passages 51. In particular, the retention capacity is increased with respect to long and fine debris.

The presence of the lower plate 43 also allows the orientation of the flow lines of the water to be further increased and therefore allows the vibrations and the risks of damage to the rods 3 caused by fretting to be limited.

This result is further increased owing to the convergent, then divergent shape of the passages 51, which allows the water to be obtained and guided over a greater distance and thus allows the lateral flow speeds to be further reduced.

Nonetheless, the end-piece 7 has a relatively reduced pressure drop amongst those of end-pieces having simple anti-debris devices and having complex anti-debris devices of the prior art. This therefore facilitates the use thereof in cores where all the assemblies do not have the same bottom end-pieces, since the deviation of pressure loss relative to that brought about by the surrounding end-pieces is reduced.

The production costs of the end-piece 7 are also reduced, in particular owing to the fact that the body 29 and the plate 43 may be produced separately or in a single piece by means of moulding, and therefore do not require assembly of a large number of elements as in some anti-debris devices, such as that of U.S. Pat. No. 5,030,412.

In the event of a serious accident, such as an earthquake, or a loss of cooling water from the coolant circuit, the blocks 33 prevent the rods 3 from falling through the bottom end-piece 7.

Since this axial retention is provided by the network of blocks 33, or even by the nozzles 39 in some variants in which blocks 33 are not provided, it was possible to superimpose the network of passages 51 on that of the nozzles 39, in contrast to what might have been suggested by the prior art, wherein attempts were made to retain the ribs of the anti-debris devices with respect to the rods 3 in order to prevent them from falling.

The passages 51 may have varied forms other than those described above, in particular by adjusting the sections thereof, the height of the portions 53 and 55 which do not necessarily constitute halves, the divergence or convergence thereof, or even the lack of divergence or convergence. These various forms may be obtained by adjusting the partitions 45 and/or the nozzles 39.

Figure 5:
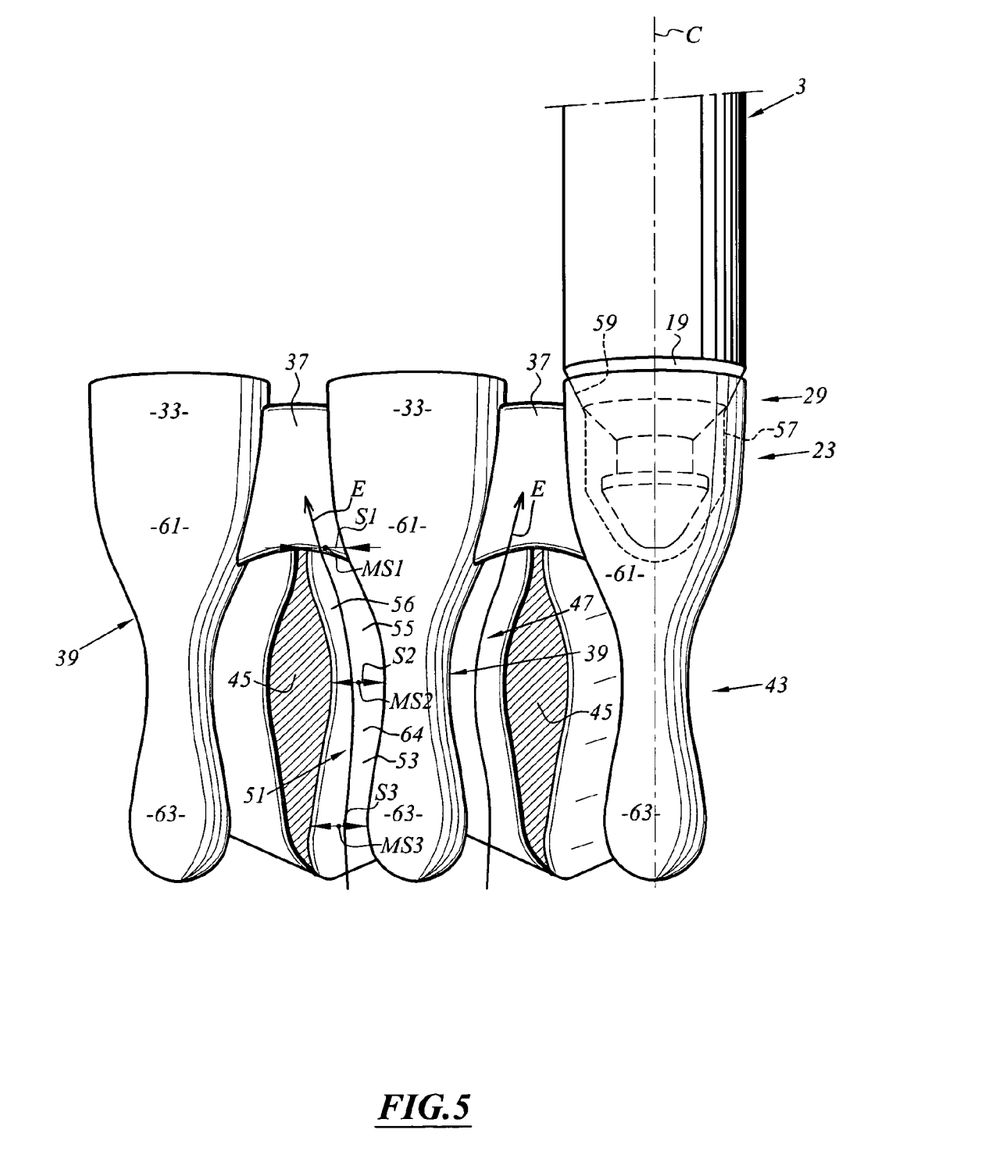
FIG. 5 is a view similar to FIG. 4 illustrating a first variant.

In this manner, FIG. 5 illustrates a variant in which the nozzles 39 each comprise an upper portion 61 which converges in a downward direction and which is extended with a lower portion 63 which diverges in a downward direction in order to successively form two baffles 56 and 64.

It will be noted that the lower end of the lower portion 63 is rounded so as not to inhibit the flow of the water.

Using the same references as in FIG. 4, the passage 51 further comprises the downstream section S1, the intermediate section S2, an upstream section S3 which is radially offset outwards relative to the section S2 in order to form a second baffle 64 which is curved in the opposite direction with respect to that of the baffle 56.

The capacity for blocking debris is therefore further increased in this variant.

In the examples described above, the cross-sections of the passage 51 are based on discs or rings, but other shapes, for example, polygonal with rounded corners may be used and combined.

Figure 6:
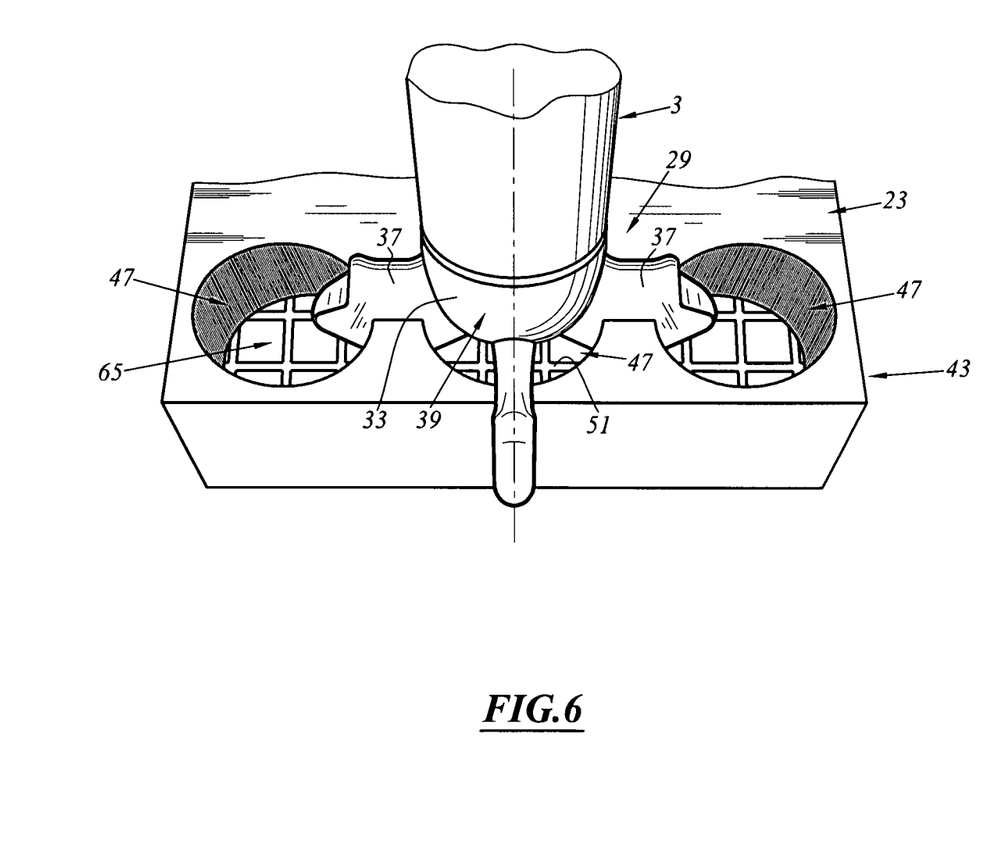
FIGS. 6 and 7 are schematic partial perspective views illustrating two other variants of the invention.

In order to further increase the capacity for retaining debris, it is possible to add an additional grid, for example, below the plate 43 as illustrated in FIG. 6. In this FIG. 6, the grid is indicated with the reference numeral 65, only three ribs 37 have been partially illustrated and the shape of the plate 43 has been simplified. A grid 31, for example, similar to that of FIG. 3, may also be provided above the body 29 in addition to or in place of the grid 65.

It is also possible to use sleeves in addition to or in place of the supplementary grids mentioned above.

Figure 7:
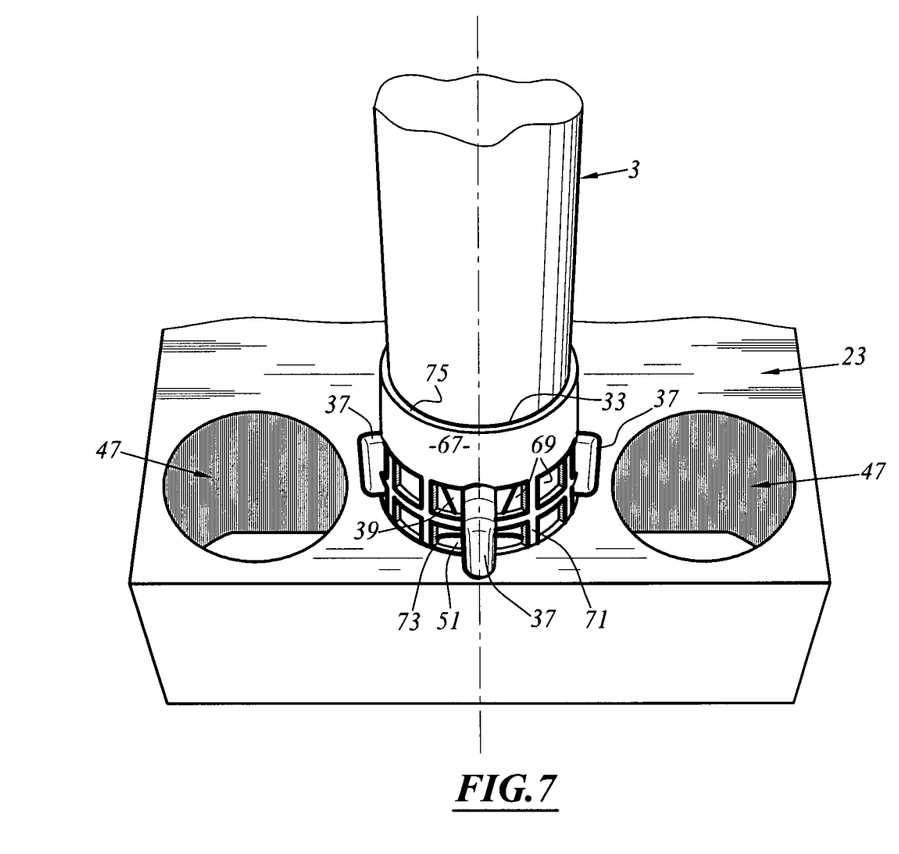

A sleeve 67 of this type is illustrated in FIG. 7. This sleeve 67 is provided with a series of water flow openings 69 which are delimited by branches 71 which are intended to retain the debris.

A sleeve 67 is provided, for example, for each rod assembly 3, block 33, nozzle 39 and passage 51 corresponding to a node of the network.

The lower end 73 of the sleeve 67 is engaged in the upper end of the channel 47 where it is retained, for example, in a resilient manner. The upper end 75 of the sleeve 67 is, for example, engaged in a resilient manner around the block 33. The sleeve 67 therefore closes the downstream end of the passage 51 and the cooling water from the passage 51 necessarily passes through the sleeve 67 which increases the debris retention capacity.

The upper end of the sleeve 67 has a zone which is not provided with water flow openings and which internally delimits a cavity with the nozzle 39. This cavity allows filamentary debris to be trapped, which further increases the debris retention capacity.

In the examples described above, the rods 3 are retained laterally by the body 29 but this is not always necessarily the case.

In this manner, in an assembly 1 according to the invention, the lower plugs 19 of the rods 3 may be spaced-apart from the bottom end-piece 7. However, most of the rods 3 will cover a nozzle 39 which is itself engaged in a channel 47 of the plate 43 in order to delimit a passage 51 for flow of the fluid, in this instance, the cooling water. "Most of the rods 3" is intended to refer to at least 50% of the rods 3, preferably at least 70% and even more preferably 90% thereof.

Also, the nozzles 39 are generally not necessarily covered by blocks 33.

All the passages 51 also generally do not necessarily have the same shape within the end-piece 7.

It will also be noted that the plate 43 may comprise, in addition to the channels 47 described above, additional channels 47 which are not arranged at the nodes of the network of the fuel rods 3, tubular guiding members 11 and optional equipment tube 14. Additional channels 47 of this type may allow the pressure drop brought about by the end-piece 7 to be reduced. These additional channels 47 may also form baffles.

In the examples described above, the bottom end-piece 7 is intended for a PWR assembly. However, it should be noted that the features described above may also be used for fuel assemblies for a boiling water nuclear reactor (BWR).

The invention claimed is:

1. A bottom end-piece of a support skeleton for a fuel assembly of a light water nuclear reactor, the bottom end-piece comprising:
   direction nozzles directing the flow of water of the reactor along the lower longitudinal ends of fuel rods supported by the skeleton, the direction nozzles being arranged at nodes of a substantially regular network of the skeleton so as to be placed in a longitudinal continuation of at least some of the fuel rods and/or at least some connection elements extending between the bottom end-piece and a top end-piece of the support skeleton, and
   an anti-debris device delimiting water flow channels, at least some of the water flow channels being arranged at the nodes of the substantially regular network and each including one of the direction nozzles arranged at least partially in a corresponding one of the water flow channels, the direction nozzles arranged at least partially in the water flow channels and the anti-debris device delimiting water passages therebetween, the anti-debris device and a corresponding one of the direction nozzles at at least one of the water passages delimiting a first section and a second section which are mutually offset radially relative to a central axis of the corresponding direction nozzle and form a baffle,
   wherein the at least one water passage is delimited such that water passing longitudinally through the water passage cannot pass rectilinearly.

2. The bottom end-piece according to claim 1 wherein the anti-debris device and the corresponding direction nozzle at the at least one water passage further delimit a third section, the third section being radially offset relative to the second section with respect to the central axis of the corresponding direction nozzle, the first section, the second section and the third section following each other in order to form two successive baffles of opposing directions.

3. The bottom end-piece according to claim 1 wherein the at least one water passage surrounds the corresponding direction nozzle.

4. The bottom end-piece according to claim 1 wherein the at least one water passage has a downstream portion diverging in the flow direction of the water.

5. The bottom end-piece according to claim 1 wherein the at least one water passage has an upstream portion converging in the flow direction of the water.

6. The bottom end-piece according to claim 1 wherein the direction nozzles and the anti-debris device are integral.

7. The bottom end-piece according to claim 1 wherein the bottom end-piece comprises at least one additional grid for retaining debris which is fitted upstream and/or downstream of the water passages.

8. The bottom end-piece according to claim 1 further comprising at least one debris retaining sleeve extending longitudinally between the downstream end of the at least one water flow channel and a block covering the corresponding direction nozzle.

9. The bottom end-piece according to claim 8 wherein the sleeve comprises a zone which has no water flow opening and which delimits a cavity for trapping debris with the corresponding direction nozzle.

10. The bottom end-piece according to claim 1 further comprising a device laterally retaining the lower longitudinal ends of substantially all the fuel rods.

11. The bottom end-piece according to claim 10 wherein the retention device includes holes for receiving the lower longitudinal ends of the fuel rods which are provided in blocks which cover the direction nozzles.

12. A fuel assembly for a nuclear reactor, the assembly comprising:
   fuel rods including lower end plugs at lower longitudinal ends thereof; and
   a skeleton for supporting the fuel rods, the fuel rods extending in a longitudinal direction and being arranged at nodes of a substantially regular network of the skeleton, the support skeleton comprising a bottom end-piece and a top end-piece and elements for connecting the end-pieces, the fuel rods being arranged longitudinally between the end-pieces, the bottom end-piece comprising:
   direction nozzles directing the flow of water of the reactor along the lower longitudinal ends of the fuel rods supported by the skeleton, the direction nozzles being arranged at the nodes of the substantially regular network so as to be placed longitudinally below the fuel rods or elements for connecting the end-pieces in a longitudinal continuation of at least some of the fuel rods and/or at least some connection elements extending between the bottom end-piece and the top end-piece of the support skeleton, and
   an anti-debris device delimiting water flow channels, at least some of the water flow channels being arranged at the nodes of the substantially regular network and each including one of the direction nozzles arranged at least partially in a corresponding one of the water flow channels, the direction nozzles arranged at least partially in the water flow channels and the anti-debris device delimiting water passages therebetween, the anti-debris device and a corresponding one of the direction nozzles at at least one of the water passages delimiting a first section and a second section which are mutually offset radially relative to a central axis of the corresponding direction nozzle and form a baffle.

13. The bottom end-piece according to claim 1 further comprising blocks receiving the lower longitudinal ends of at least some of the fuel rods.

14. The bottom end-piece according to claim 13 wherein the direction nozzles extend downward from the blocks into the anti-debris device.

15. The bottom end-piece according to claim 14 wherein the fuel rods include lower end plugs at the lower longitudinal ends thereof, the blocks receiving the lower end plugs.

16. The bottom end-piece according to claim 1 wherein a bottom of the anti-debris device is below the direction nozzles.

17. The bottom end-piece according to claim 1 wherein the corresponding direction nozzle and the anti-debris device are configured such that the first section is above the second section and the first section is positioned a greater distance from the central axis of the corresponding direction nozzle than the second section.

18. The bottom end-piece according to claim 17 wherein the corresponding direction nozzle and the anti-debris device are configured such that an outer diameter of the second section is less than or equal to an inner diameter of the first section.

19. The bottom end-piece according to claim 1 wherein the anti-debris device includes a grid of partitions, at least two of the partitions forming one of the water flow channels, the at least two partitions varying in thickness to form the first and second sections.

20. The bottom end-piece according to claim 19 wherein the at least two partitions each include a protrusion preventing the water passing longitudinally through the water passage from passing rectilinearly.

21. The bottom end-piece according to claim 20 wherein the at least two partitions each includes a top portion above the protrusion and a bottom portion below the protrusion, each of the top portion and the bottom portion being thinner than the protrusion.

* * * * *